US012561235B2

(12) United States Patent (10) Patent No.: US 12,561,235 B2
Varan et al. (45) Date of Patent: Feb. 24, 2026

(54) SYSTEM AND METHOD FOR GENERATING USER CUSTOMIZED SIMULATIONS

(71) Applicant: c/o SmartScience Technologies, LLC., Austin, TX (US)

(72) Inventors: Duane Varan, Austin, TX (US); Erik Marc Johnson, Austin, TX (US)

(73) Assignee: SmartScience Technologies, LLC, Austin, TX (US)

( * ) Notice: Subject to any disclaimer, the term of this patent is extended or adjusted under 35 U.S.C. 154(b) by 325 days.

(21) Appl. No.: 18/493,322

(22) Filed: Oct. 24, 2023

(65) Prior Publication Data

US 2025/0130930 A1 Apr. 24, 2025

(51) Int. Cl.
*G06F 11/3668* (2025.01)
*G06F 11/3698* (2025.01)

(52) U.S. Cl.
CPC ...... *G06F 11/3688* (2013.01); *G06F 11/3698* (2025.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 9,348,569 | B1 * | 5/2016 | Chopra | ................... G06F 11/14 |
| 12,190,088 | B1 * | 1/2025 | Edminster | ........... G06F 11/3688 |

| | | | | |
|---|---|---|---|---|
| 2021/0141712 | A1 * | 5/2021 | Gevorkyan | ............ G06N 20/00 |
| 2021/0286924 | A1 * | 9/2021 | Wyrwas | .................. G06F 30/15 |
| 2022/0405189 | A1 * | 12/2022 | De Souza | ............. G06F 11/323 |
| 2023/0071472 | A1 * | 3/2023 | Miller | ................. G06F 11/3438 |
| 2023/0168995 | A1 * | 6/2023 | Retnasaba | ........... G06F 11/3006 |
| | | | | 717/124 |
| 2023/0246981 | A1 * | 8/2023 | Grushka | ............ G06F 11/3688 |
| | | | | 709/226 |
| 2023/0394327 | A1 * | 12/2023 | Frazier | .................. G06N 20/00 |
| 2023/0409461 | A1 * | 12/2023 | Weisz | ................. G06F 11/3688 |
| 2024/0118993 | A1 * | 4/2024 | Garvey | .............. G06F 11/3692 |
| 2024/0320591 | A1 * | 9/2024 | Garvey | .................. G06F 30/27 |
| 2024/0394433 | A1 * | 11/2024 | Reiss | ...................... G06F 9/541 |
| 2025/0077963 | A1 * | 3/2025 | Shin | ........................ G06N 3/08 |

OTHER PUBLICATIONS

Ali et al., "An Empirical Investigation of Software Customization and Its Impact on the Quality of Software as a Service: Perspectives from Software Professionals," MDPI, 2021. (Year: 2021).*
Boumiza et al., "Design and development of a user interface to customize web testing scenarios," IEEE, 2012. (Year: 2012).*
Correa et al., "Software Testing Automation of VR-Based Systems With Haptic Interfaces," British Computer Society, 2020. (Year: 2020).*

(Continued)

*Primary Examiner* — Ryan D. Coyer
(74) *Attorney, Agent, or Firm* — Lee & Hayes, P.C.

(57) ABSTRACT

Techniques are described for generating user customized simulation instances for testing and evaluation of software applications and services. In some cases, the system may generate user specific simulation instances to replicate in the simulation a user experience of each user when the user is engaged with the live version of the software application or service.

18 Claims, 6 Drawing Sheets

(56) References Cited

OTHER PUBLICATIONS

Floss et al., "Software Testing as a Service," IEEE, 2013. (Year: 2013).*

Hadi et al., "Designing and quality testing of "Digichip" virtual simulation software of Android platform for mobile-virtual learning supporting vocational mechatronics engineering," Jurnal Pendidikan Vokasi, 2019. (Year: 2019).*

Riungu et al., "Software Testing as an Online Service: Observations from Practice," IEEE, 2010. (Year: 2010).*

\* cited by examiner

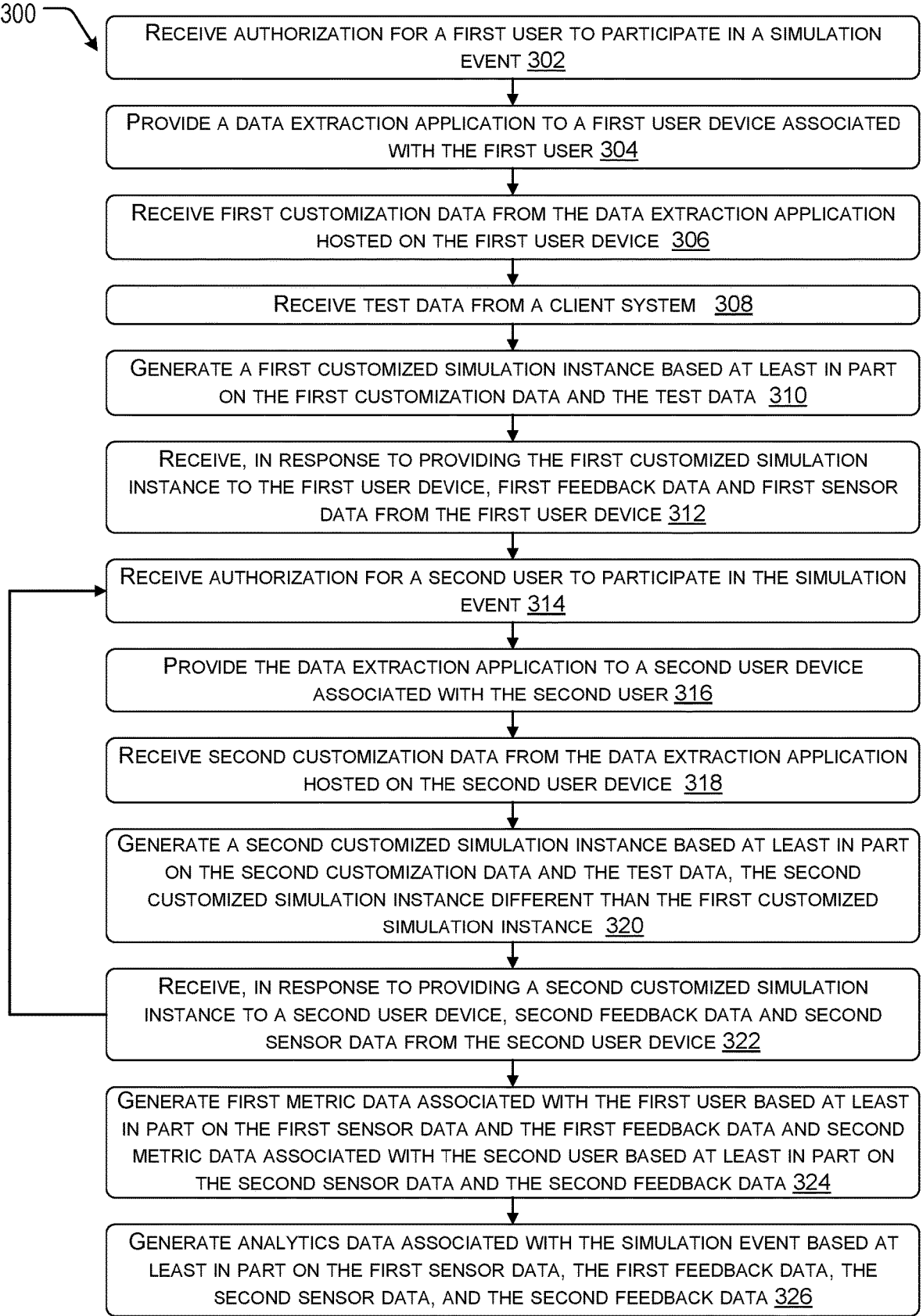

300

RECEIVE AUTHORIZATION FOR A FIRST USER TO PARTICIPATE IN A SIMULATION EVENT 302

PROVIDE A DATA EXTRACTION APPLICATION TO A FIRST USER DEVICE ASSOCIATED WITH THE FIRST USER 304

RECEIVE FIRST CUSTOMIZATION DATA FROM THE DATA EXTRACTION APPLICATION HOSTED ON THE FIRST USER DEVICE 306

RECEIVE TEST DATA FROM A CLIENT SYSTEM 308

GENERATE A FIRST CUSTOMIZED SIMULATION INSTANCE BASED AT LEAST IN PART ON THE FIRST CUSTOMIZATION DATA AND THE TEST DATA 310

RECEIVE, IN RESPONSE TO PROVIDING THE FIRST CUSTOMIZED SIMULATION INSTANCE TO THE FIRST USER DEVICE, FIRST FEEDBACK DATA AND FIRST SENSOR DATA FROM THE FIRST USER DEVICE 312

RECEIVE AUTHORIZATION FOR A SECOND USER TO PARTICIPATE IN THE SIMULATION EVENT 314

PROVIDE THE DATA EXTRACTION APPLICATION TO A SECOND USER DEVICE ASSOCIATED WITH THE SECOND USER 316

RECEIVE SECOND CUSTOMIZATION DATA FROM THE DATA EXTRACTION APPLICATION HOSTED ON THE SECOND USER DEVICE 318

GENERATE A SECOND CUSTOMIZED SIMULATION INSTANCE BASED AT LEAST IN PART ON THE SECOND CUSTOMIZATION DATA AND THE TEST DATA, THE SECOND CUSTOMIZED SIMULATION INSTANCE DIFFERENT THAN THE FIRST CUSTOMIZED SIMULATION INSTANCE 320

RECEIVE, IN RESPONSE TO PROVIDING A SECOND CUSTOMIZED SIMULATION INSTANCE TO A SECOND USER DEVICE, SECOND FEEDBACK DATA AND SECOND SENSOR DATA FROM THE SECOND USER DEVICE 322

GENERATE FIRST METRIC DATA ASSOCIATED WITH THE FIRST USER BASED AT LEAST IN PART ON THE FIRST SENSOR DATA AND THE FIRST FEEDBACK DATA AND SECOND METRIC DATA ASSOCIATED WITH THE SECOND USER BASED AT LEAST IN PART ON THE SECOND SENSOR DATA AND THE SECOND FEEDBACK DATA 324

GENERATE ANALYTICS DATA ASSOCIATED WITH THE SIMULATION EVENT BASED AT LEAST IN PART ON THE FIRST SENSOR DATA, THE FIRST FEEDBACK DATA, THE SECOND SENSOR DATA, AND THE SECOND FEEDBACK DATA 326

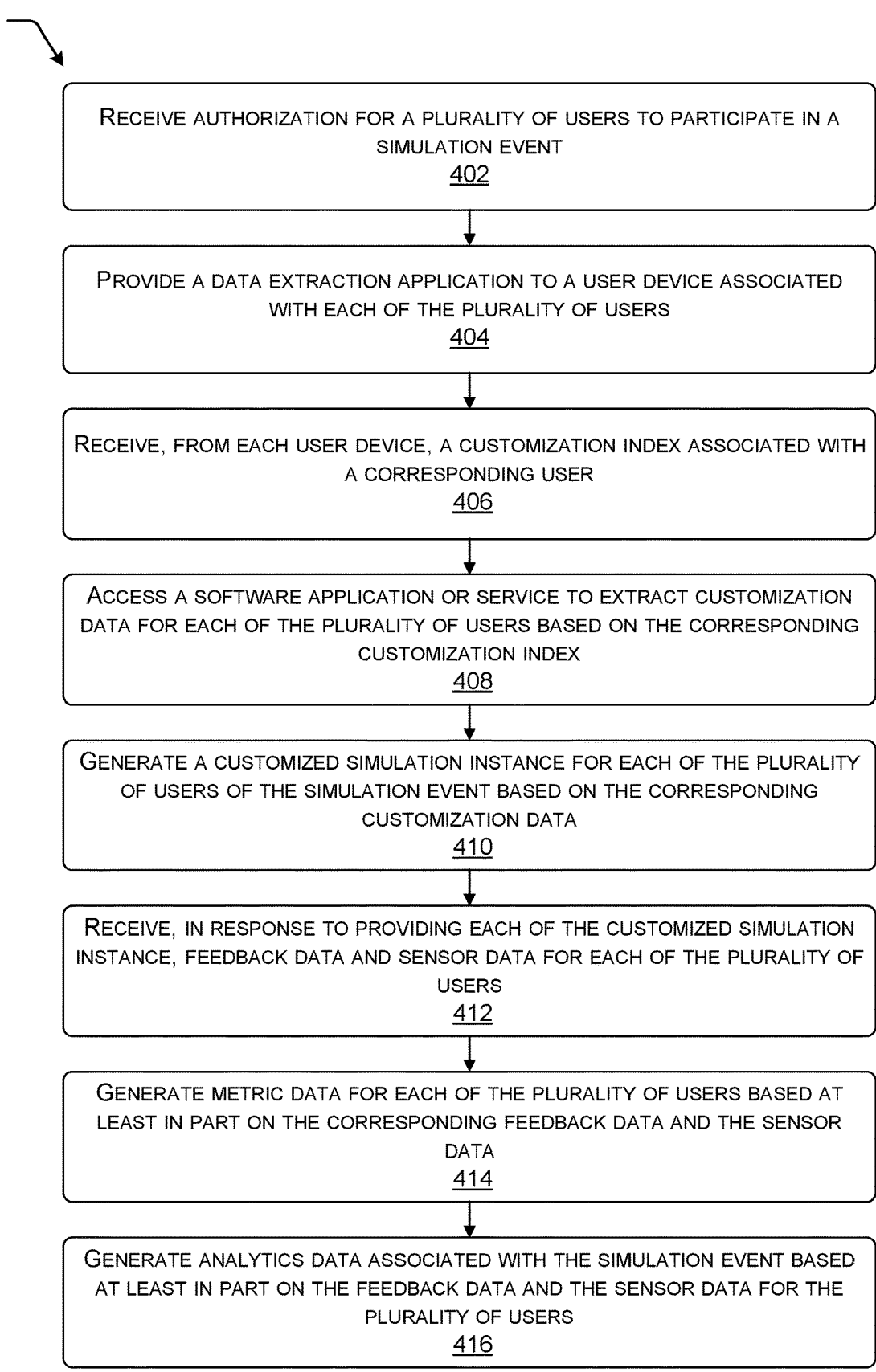

RECEIVE AUTHORIZATION FOR A PLURALITY OF USERS TO PARTICIPATE IN A SIMULATION EVENT
402

PROVIDE A DATA EXTRACTION APPLICATION TO A USER DEVICE ASSOCIATED WITH EACH OF THE PLURALITY OF USERS
404

RECEIVE, FROM EACH USER DEVICE, A CUSTOMIZATION INDEX ASSOCIATED WITH A CORRESPONDING USER
406

ACCESS A SOFTWARE APPLICATION OR SERVICE TO EXTRACT CUSTOMIZATION DATA FOR EACH OF THE PLURALITY OF USERS BASED ON THE CORRESPONDING CUSTOMIZATION INDEX
408

GENERATE A CUSTOMIZED SIMULATION INSTANCE FOR EACH OF THE PLURALITY OF USERS OF THE SIMULATION EVENT BASED ON THE CORRESPONDING CUSTOMIZATION DATA
410

RECEIVE, IN RESPONSE TO PROVIDING EACH OF THE CUSTOMIZED SIMULATION INSTANCE, FEEDBACK DATA AND SENSOR DATA FOR EACH OF THE PLURALITY OF USERS
412

GENERATE METRIC DATA FOR EACH OF THE PLURALITY OF USERS BASED AT LEAST IN PART ON THE CORRESPONDING FEEDBACK DATA AND THE SENSOR DATA
414

GENERATE ANALYTICS DATA ASSOCIATED WITH THE SIMULATION EVENT BASED AT LEAST IN PART ON THE FEEDBACK DATA AND THE SENSOR DATA FOR THE PLURALITY OF USERS
416

FIG. 4

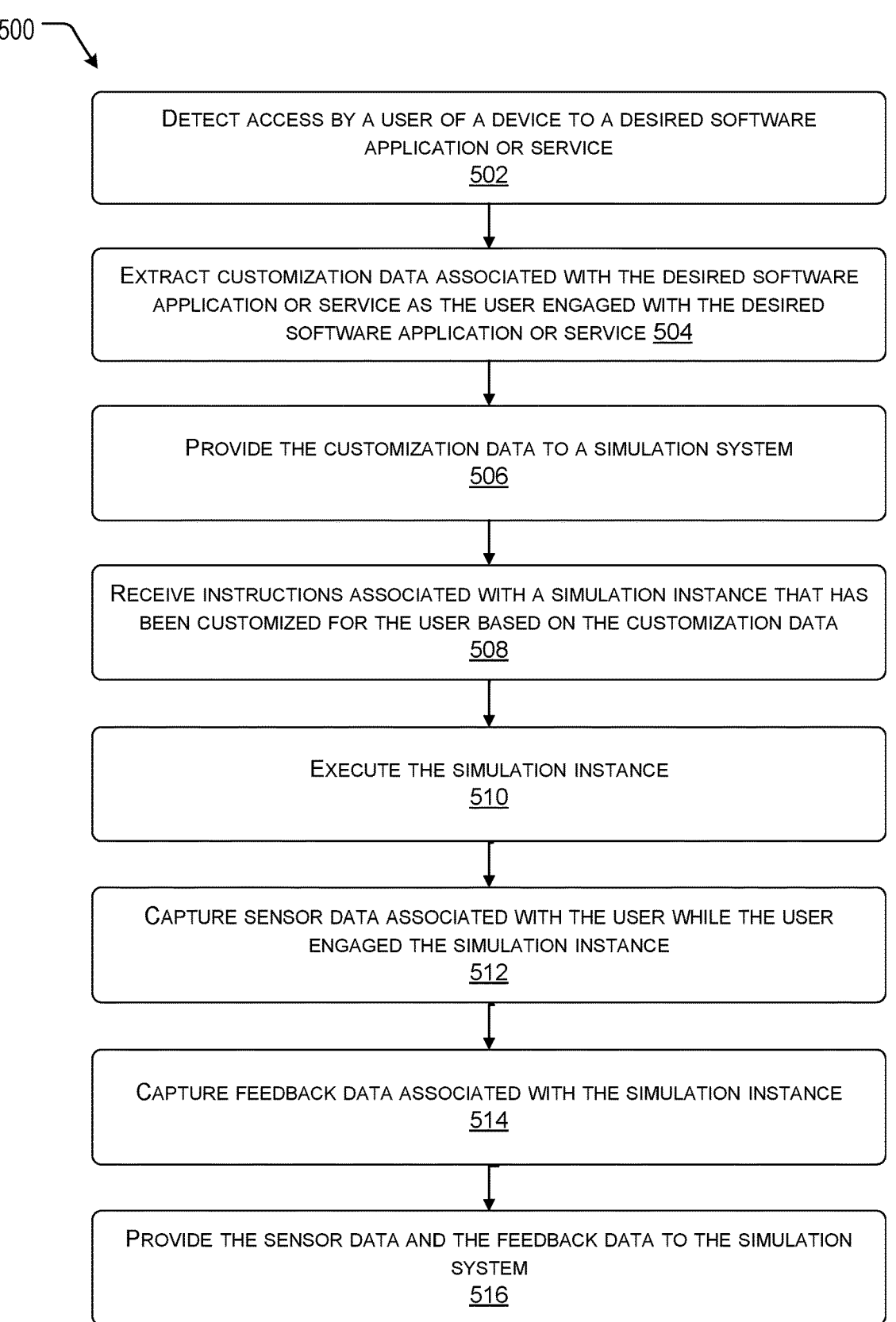

500

DETECT ACCESS BY A USER OF A DEVICE TO A DESIRED SOFTWARE APPLICATION OR SERVICE
502

EXTRACT CUSTOMIZATION DATA ASSOCIATED WITH THE DESIRED SOFTWARE APPLICATION OR SERVICE AS THE USER ENGAGED WITH THE DESIRED SOFTWARE APPLICATION OR SERVICE 504

PROVIDE THE CUSTOMIZATION DATA TO A SIMULATION SYSTEM
506

RECEIVE INSTRUCTIONS ASSOCIATED WITH A SIMULATION INSTANCE THAT HAS BEEN CUSTOMIZED FOR THE USER BASED ON THE CUSTOMIZATION DATA
508

EXECUTE THE SIMULATION INSTANCE
510

CAPTURE SENSOR DATA ASSOCIATED WITH THE USER WHILE THE USER ENGAGED THE SIMULATION INSTANCE
512

CAPTURE FEEDBACK DATA ASSOCIATED WITH THE SIMULATION INSTANCE
514

PROVIDE THE SENSOR DATA AND THE FEEDBACK DATA TO THE SIMULATION SYSTEM
516

FIG. 5

SYSTEM AND METHOD FOR GENERATING USER CUSTOMIZED SIMULATIONS

BACKGROUND

Today, the use of simulated testing for products and products and services continues to become more and more common. Often each simulation instance is generated based on the same data set collected and curated by an entity. However, today many software applications are configured to present a custom or tailored experience for the end user, either via user customization or learned preferences. Unfortunately, the simulation instances generated by conventional simulation systems fail to provide the customization that users have come to expect with regards to their software applications, resulting in a simulation experience of lower quality than when the user is engaged with live software applications. In some cases, the lower quality may bias any data collected during the simulation instance, thereby reducing the effectiveness of simulated testing.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 illustrates an example flow diagram showing an illustrative process for generating user specific simulation instances according to some implementations.

FIG. 4 illustrates another example flow diagram showing an illustrative process for generating user specific simulation instances according to some implementations.

FIG. 5 illustrates an example flow diagram showing an illustrative process for extracting customization data for users of the simulation system according to some implementations.

DETAILED DESCRIPTION

Figure 1:
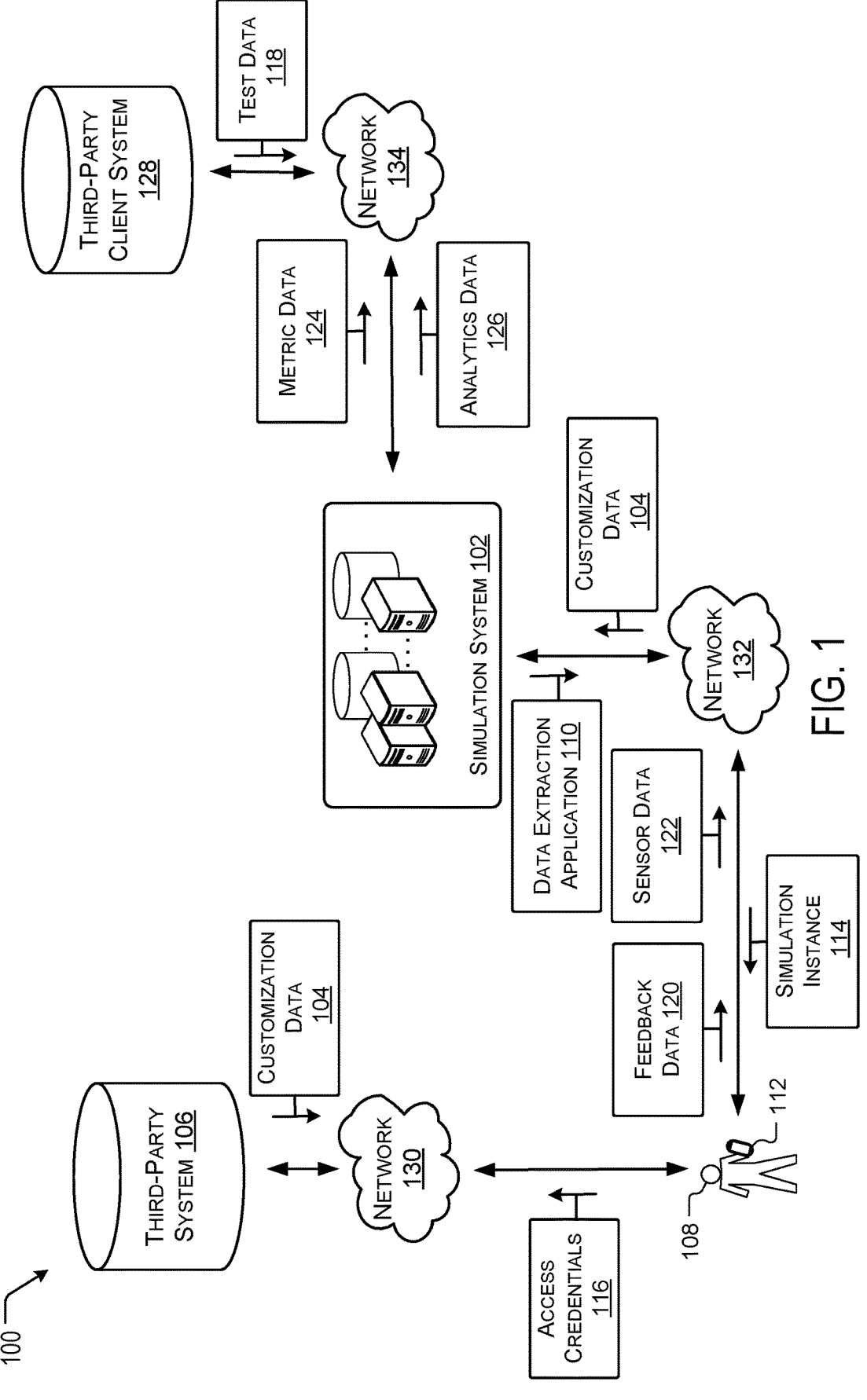
FIG. 1 is an example block diagram of a simulation system for generating user specific simulation instances according to some implementations.

Discussed herein are devices and techniques for extracting user customization data from software applications and/or services and generating user specific customized simulation instances representative of the user experience encountered during live access to the user account of a software application or service. For example, software applications or services, such as social media services, social sharing services, content streaming services, content delivery services, marketplace services, and the like often provide a user with customizable interfaces (e.g., via user settings) and/or interfaces customized on behalf of the user (e.g., via learned preferences, habits, tastes, and the like). However, conventional simulation systems often generate simulation instances that deliver a consistent experience, user interface, and interactions across all test subjects or users of a set of users. Unfortunately, when testing or evaluating services and/or products associated with software applications and/or services that users have become accustomed to a specific user customized experience that is unique to them and differ between users can result in lower quality or lower perceived quality when the user is engaged with the consistent simulation instance. The lower quality or lower perceived quality associated with simulation of the conventional simulation systems may then bias any data collected with regards to the test products, test services, test content, or the like being presented to a user via the consistent simulation instance. Accordingly, the simulation system, discussed herein, is configured to extract customization data from a test users account with a live software application and/or service and to utilize the extracted customization data to generate a simulation instance that is representative of the specific user customized experience encountered by the user during access to live versions of the software application and/or service, thereby mitigating bias caused by the consistent or uniform simulation instances.

In some implementations, the simulation system, discussed herein, may be configured to provide a user downloadable plugin or application that may be installed on an end user device. For example, a test user may sign up or agree to participate in one or more simulations in order to evaluate a software application or service, content associated with a software application or service (e.g., streaming content, advertisement, new features, product for sale via the software application, such as via a marketplace, email services, content sharing services, or the like). After agreeing to participate in simulations for a specific software application, the simulation system may cause the plugin to be downloaded and installed on a device (e.g., smartphone, tablet, computer, or the like) associated with the user. In this manner, by utilizing the downloadable plugin, the simulation system does not necessarily require access credentials or the like with regards to the user's software applications and/or services, thereby improving overall security and confidentiality with respect to the simulation system, discussed herein.

After downloading and installing the plugin, the plugin may determine when a user accesses a software application or service associated with the simulation system (e.g., the software application or service the user agreed to participate in testing or evaluating). The plugin may then extract and/or generate customization data for the simulation based at least in part on the user experience encountered while the user engages the live software application or service via the device. In some cases, the customization data may include user settings, user parameters, user interface configurations, content data (e.g., content items, such as titles or videos consumed, images viewed, books or textual works consumed, products viewed, wish listed, purchased, advertisements encountered, or the like), user inputs (e.g., search terms entered, user selections, and the like), and the like.

In various examples, the customization data may be provided to the simulation system by the plugin operating on the device. It should be understood, that customization data may be captured and provided for each user participating in simulations and for each software application or service being evaluated by the specific participating user. As the simulation system receives the customization data for a specific user and specific software application, the simulation system may generate a simulation instance. The simulation instance may be generated based at least in part on the customization data received from the user device, data known about the user (e.g., demographic information, such as race, sex, gender, address, education, income, content taste profiles, and the like), historical data associated with the user and/or the software application, application data associated with the software application being tested (e.g., historical data, interface data, user data, content data, and the like), and the like.

In some cases, the simulation instance may also be generated based at least in part on third-party client data associated with a service, feature, product, interface, advertisement, or the like to be evaluated by the participating user. For instance, if the software application or service is a social video sharing application, the third-party client data may include a video or advertisement that the third-party desires to evaluate reception prior to launching or offering to the public via the software application. In the current example, the simulation system may generate a simulation instance using the customization data together with data known about the software application (such as received from the entity offering the software application or service or captured at a prior time). Accordingly, the simulation instance may include titles, advertisements, shared content, as well as a user interface that is substantially similar to the experience that the user typically encountered when engaged in the live application or service.

The simulation system may then insert the third-party client data, e.g., the video or advertisement in the above example, into the simulation instance that is already customized to the experience typically encountered by the user. In the case of the video, the simulation system may insert the content data as a recommended video, a feature video, a top choice in one or more reels, or the like. In the case of the advertisement, the simulation system may insert the content data as a banner ad or the like, a commercial during consumption of a streamed content item, a combination thereof or the like. In other examples, the third-party client data may include new features, user interface changes, changes in pricing, new optimizations (e.g., content delivery speeds, load times, and the like), and the like. in these cases, the simulation system may again modify the customized simulation instance to accommodate the additional feature or user interface changes. In some cases, the simulation system may provide visual indications to the third-party client data inserted into the simulation instance so that the user is aware of the changes, new content data, or the like. In other cases, the simulation system may simply insert the third-party client data without notice to the participating user. In this manner, each user may encounter a user experience similar to live applications or services while still confronting the third-party client data (e.g., content data, feature data, interface data, or the like) being evaluated by the participating user during execution of the simulation instance.

The simulation system may be configured to receive and to allow the participating users to provide user feedback, engagement metrics, and/or evaluation metrics associated with simulation instance content including the third-party client data being evaluated. For example, the simulation system may be used to assist in determining user reception of content, features, and/or interfaces across various different services, commercial or advertisement effectiveness, engagement, or reception across various different services and/or different content items. In some cases, the simulation system may also be utilized to receive user feedback, engagement metrics, and/or evaluation metrics associated with advertisements or commercials that are to be placed with respect to different content or services for the third party responsible for providing the software application or service, the third party responsible for providing the content being paired with the advertisement or commercial, and/or the third-party providing the advertisement or commercial, and/or competitors of the software application or service, content providers, and/or advertisement providers.

In some examples, the simulation system may generate metrics based on multiple evaluations of received user interaction data, feedback data, and/or sensor data. For example, the simulation system may provide the user interaction data, feedback data, and/or sensor data to one or more reviewers or simulation system operators that may review the user interaction data, feedback data, and/or sensor data and generate initial metrics for each simulation instance or the combined simulation instances across multiple users. For instance, as each user encounters a customized simulation instance, the simulation system may perform aggregation or normalization techniques on the user interaction data, feedback data, and/or sensor data to provide the metrics to the third party client.

In some case, the initial metrics and/or the normalized metrics may be processed via statistical analysis techniques (e.g., averaged, weighted, or the like) to generate metrics associated with the user's reaction, responses, emotions, or the like of the customized simulation instances including the third-party client data. In some cases, the simulation system may utilize multiple machine learned models or programs to evaluate the user interaction data, feedback data, and/or sensor data and generate the initial metrics in lieu of or in addition to operator metrics.

In some implementations, as the user engages with the customized simulation instance of the streaming service, the simulation system captures data associated with the simulated session (e.g., the period of time the user is engaged with the simulation). In some examples, the simulation system may capture image data of the participating user via one or more cameras or image devices associated with the user device, audio data associated with the participating user via one or more microphones associated with the user device, and/or other physiological data via various biometric sensors either coupled to the user device or incorporated into the user device. In some examples, the participating user may utilize additional data capture systems, such as a physiological monitoring system worn by the participating user, such as on the head, hands, fingers, or the like of the participating user.

In an example, physiological data of the user may be captured by the physiological monitoring system. Physiological data may include blood pressure, heart rate, pulse oximetry, respiratory rate, brain activity, eye movement, facial features, body movement, and so on. The physiological data may be used in determining a mood or response of the user to content (e.g., streaming titles, advertisements, or the like) displayed to the user or system responses to interactions of the user with the simulated streaming service. In some examples, an eye tracking device of the physiological monitoring system as described herein may utilize image data associated with the eyes of the user as well as facial features (such as features controlled by the user's corrugator and/or zygomaticus muscles) to determine a portion of a display that is currently the focus of the user's attention.

In some cases, the physiological monitoring system may include a headset device that may include one or more inward-facing image capture devices, one or more outward-facing image capture devices, one or more microphones, and/or one or more other sensors (e.g., an eye tracking device). The sensor data may include image data captured by inward-facing image capture devices as well as image data captured by outward-facing image capture devices. The sensor data may also include sensor data captured by other sensors of the physiological monitoring system, such as audio data (e.g., speech of the user that may be provided to the focus group platform) and other physiological data such as blood pressure, heart rate, pulse oximetry, respiratory rate, brain activity, body movement, and so on. In the current example, the sensor data may be sent to the platform.

In one example, an eye tracking device of the physiological monitoring system may be configured as a wearable appliance (e.g., headset device) that secures one or more inward-facing image capture devices (such as a camera). The inward-facing image capture devices may be secured in a manner that the image capture devices have a clear view of both the eyes as well as the cheek or mouth regions (zygomaticus muscles) and forehead region (corrugator muscles) of the user. For instance, the eye tracking device of the physiological monitoring system may secure to the head of the user via one or more earpieces or earcups in proximity to the ears of the user. The earpieces may be physically coupled via an adjustable strap configured to fit over the top of the head of the user and/or along the back of the user's head. Implementations are not limited to systems including eye tracking and eye tracking devices and implementations are not limited to headset devices. For example, some implementations may not include eye tracking or facial feature capture devices, while other implementations may include eye tracking and/or facial feature capture device(s) in other configurations (e.g., eye tracking and/or facial feature capture from sensor data captured by devices in the user device).

In some implementations, the inward-facing image capture device may be positioned on a boom arm extending outward from the earpiece. In a binocular example, two boom arms may be used (one on either side of the user's head). In this example, either or both of the boom arms may also be equipped with one or more microphones to capture words spoken by the user. In one particular example, the one or more microphones may be positioned on a third boom arm extending toward the mouth of the user. Further, the earpieces of the eye-tracking device of the physiological monitoring system may be equipped with one or more speakers to output and direct sound into the ear canal of the user. In other examples, the earpieces may be configured to leave the ear canal of the user unobstructed. In various implementations, the eye tracking device of the physiological monitoring system may also be equipped with outward-facing image capture device(s). For example, to assist with eye tracking, the eye tracking device of the physiological monitoring system may be configured to determine a portion or portions of a display that the user is viewing (or actual object, such as when the physiological monitoring system is used in conjunction with a focus group environment). In this manner, the outward-facing image capture devices may be aligned with the eyes of the user and the inward-facing image capture device may be positioned to capture image data of the eyes (e.g., pupil positions, iris dilations, corneal reflections, etc.), cheeks (e.g., zygomaticus muscles), and forehead (e.g., corrugator muscles) on respective sides of the user's face. In various implementations, the inward and/or outward image capture devices may have various sizes and figures of merit, for instance, the image capture devices may include one or more wide screen cameras, red-green-blue cameras, mono-color cameras, three-dimensional cameras, high definition cameras, video cameras, monocular cameras, among other types of cameras. Additionally, the physiological monitoring system discussed herein may be used comfortably by individuals that wear glasses on a day to day basis, thereby improving user comfort and allowing more individuals to enjoy a positive experience when using personal eye tracking systems.

In some cases, each customized simulation instance may also allow the user to provide feedback, such as text-based or verbal, back to the simulation system. For example, the customized simulated instance may include a first portion of an interface for simulating the software application or service and a second portion of the interface to allow the user to provide text based comments, input rating (such as via one or more sliders for like/dislike, fear/joy, clarity/confusion, or the like). In still other examples, the second portion of the simulation instance may include numerical ratings such as allowing the user to input one to five stars, one or more thumbs up or down, or the like. In another example, the participating user may provide the feedback via a microphone associated with a television controller or remote control or other audio capture device (e.g., one or more microphones associated with a personal computing device, an audio controlled device, or the like).

In the various example, the simulation system may receive the image data, audio data, physiological data, feedback, and the like from multiple users each engaged in a customized simulation instance associated with an evaluation simulation set regarding a specific set of third-party client data being evaluated. The simulation system may then determine analytics or metrics associated with the performance of one or more features of the software application or service, a reception of content, an engagement of content or the user interface, and the like. Accordingly, the simulation system may aggregate the received data and output various reports that may be used by third parties to evaluate changes to the software application or service interface and/or to assist with content placement. In some cases, the simulation system may utilize one or more machine learned models to analyze the received data (e.g., the image data, the audio data, the physiological data, the feedback, and the like).

In some examples, the machine learned models may be generated using various machine learning techniques. For example, the models may be generated using one or more neural network(s). A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatter-plot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

Additional details related to the simulation system collecting data, monitoring test subjects, and generating analytics and metrics may be discussed in U.S. application Ser. No. 18/485,432 entitled "System for Evaluating Streaming Services and Content", which is herein incorporated by reference in its entirety for all purposes.

FIG. 1 is an example block diagram 100 of a simulation system 102 for generating user specific simulation instances with respect to a specific simulation event according to some implementations. For instance, as discussed above, many types of software applications or services (e.g., social media services, social sharing services, content streaming services, content delivery services, marketplace services, and the like) often provide a user customizable (e.g., via user settings) and/or customized (e.g., via learned preferences, habits, tastes, and the like) user experience on behalf of each individual user. Unfortunately, conventional simulation systems often generate simulation instances that deliver a consistent experience, user interface, and interactions across all test subjects or users of a set of users (e.g., each user experience the same user interface, content, and overall experience). However, when testing or evaluating services and/or products associated with software applications and/or services that users have become accustomed to a specific user customized experience that is unique to them, experiencing the consistent non-customized application can result in lower quality or lower perceived quality of the application or service, thereby negatively biasing any data collected with regards to the test products, test services, test content, or the like being presented to a user via the consistent simulation instance.

Accordingly, the simulation system 102 is configured to extract customization data 104 from a test users account with a live software application and/or service, illustrated herein as third-party system 106, and to utilize the extracted customization data 104 to generate a simulation instance that is representative of the specific user's customized experience encountered by the user 108 during access to live versions of the software application and/or service, thereby mitigating bias caused by the consistent or uniform simulation instances.

In some implementations, the simulation system 102 may be configured to provide a user downloadable plugin or application, illustrated herein as data extraction application 110, that may be installed on a user device, such as device 112. For example, a user 108 may sign up or agree to participate in one or more simulations, such as by submitting one or more forms to the simulation system 102. After, agreeing to participate in one or more simulations applications, the simulation system 102 may cause the data extraction application 110 to be downloaded and installed on a device 112 (e.g., smartphone, tablet, computer, or the like) associated with the user 108. In this manner, by utilizing the downloadable data extraction application 110, the simulation system 102 does not necessarily require access credentials or the like with regards to the user's account with the third-party system 106.

After downloading and installing the data extraction application 110 on the device 112, the data extraction application 110 may determine when the user 108 utilizes the device 112 to access a software application or service associated with the third-party system 106 and targeted for a simulation event (e.g., criteria associated with a set of simulation instances associated with a single test, session, evaluation and/or simulation). For example, the user 108 may utilize the device 112 to input access credentials 116 to authenticate and access their account with the third-party system 106.

The data extraction application 110 may then extract, capture, and/or otherwise generate the customization data 104 for use by the simulation system 102 to generate a customized simulation instance 114 associated with the third-party system 106. For example, the simulation system 102 may generate the simulation instance 114 associated with a simulation event based at least in part on the customization data 104 extracted or captured by the data extraction application 110. In some cases, the customization data 104 may include user settings, user parameters, user interface configurations, content data (e.g., content items, such as titles or videos consumed, images viewed, books or textual works consumed, products viewed, wish listed, purchased, or the like, advertisements encountered, or the like), user inputs (e.g., search terms entered, user selections, and the like), and the like. In various examples, the customization data 104 may be provided to the simulation system 102 by the data extraction application 110 operating on the device 112. It should be understood, that in the current example, a single user 108, single device 112, and single simulation instance 114 is generated based on the corresponding customization data 104 and that additional data extraction applications may operate on additional user device to capture customization data for each user participating in a simulation event.

As the simulation system 102 receives the customization data 104 for a specific user, such as user 108 from the device 112, the simulation system 102 may generate a simulation instance 114. The simulation instance 114 may be generated based at least in part on the customization data 104 received from the user device 112 in combination with data known about the user 108 (e.g., demographic information, such as race, sex, gender, address, education, income, content taste profiles, and the like), historical data associated with the user 108, data known about the software application or service provided by the third party system 106, application data associated with the software application provided or service provided by the third party system 106 (e.g., historical data, interface data, user data, content data, and the like), and the like, as well as the test data 118. The test data 118 may include content data (e.g., advertisements, streaming content, textual content, image content, and the like), software edits, features, navigational experiences, performance goals, and the like. In this manner, the simulation system 102 may generate specific simulation instances 114 for each user, such as user 108, participating in a simulation event associated with specific test data 118.

In some cases, the test data 118 may also include third-party client data associated with a service, feature, product, interface, advertisement, or the like to be evaluated by the participating user. For instance, if the software application or service is a social video sharing application, the test data 118 may include a video or advertisement that the third-party desires to evaluate reception prior to launching or offering to the public via the software application. In the current example, the simulation system 102 may generate a simulation instance 114 using the customization data 104 together with test data 118. Accordingly, the simulation instance 114 may include titles, advertisements, shared content, as well as a user interface that is substantially similar to the experience that the user typically encountered when engaged in the live application or service provided by the third-party system 106 but including the test data 118 being evaluated as part of a simulation event. As one illustrative example, the simulation system 102 may insert the test data 118, e.g., the video or advertisement in the above example, into the simulation instance 114 that is already customized to the experience typically encountered by the user 108.

The simulation system 102 may be configured to receive and to allow the participating users, such as user 108, to provide user feedback data 120 and/or sensor data 122 associated with simulation instance 114. For example, the simulation system 102 may be used to assist in determining user reception of content, features, and/or interfaces across various different services, commercial or advertisement effectiveness, engagement, or reception across various different services and/or different content items. In some cases, the simulation system 102 may also be utilized to receive the feedback data 120 and the sensor data 122 and to generated, based at least in part on the feedback data 120 and the sensor data 122, engagement metrics and/or evaluation metrics associated with test data 118.

For example, the simulation system 102 may generate metric data 124 for each user participating in the simulation event. Likewise, the simulation system 102 may generate analytics data 126 for all users or sets of users participating in the simulation event. For instance, the simulation system 102 may generate the analytics data 126 based on multiple evaluations of received user interaction data, feedback data 120, and/or sensor data 122. As one specific example, the simulation system 102 may provide the feedback data 120 and/or the sensor data 122 to one or more reviewers, simulation system operators, machine learned models, or the like that may review the feedback data 120 and/or the sensor data 122 and generate initial metrics 124 for each simulation instance 114 or the analytics data 126 for combined simulation instances across multiple users. For instance, as each user encounters a customized simulation instance, the simulation system 102 may then perform aggregation or normalization techniques on the user feedback data 120 and/or sensor data 122 to generate both the metric data 120 and the analytics data 122 which may be provided to the third-party client system 128.

In some case, the initial metrics and/or the normalized metrics may be processed via statistical analysis techniques (e.g., averaged, weighted, or the like) to generate metrics associated with the user's reaction, responses, emotions, or the like of the customized simulation instances 114 including the test data 118. In some cases, the simulation system 102 may utilize multiple machine learned models or programs to evaluate the user interaction data, feedback data, and/or sensor data and generate the initial metrics in lieu of or in addition to operator metrics.

In some implementations, as the user 108 engages with the customized simulation instance 114, the simulation system 102 captures data associated with the simulated session (e.g., the period of time the user is engaged with the simulation). In some examples, the simulation system 102 may capture sensor data 122 such as image data of the participating user 108 via one or more cameras or image devices associated with the user device 112, audio data associated with the participating user 108 via one or more microphones associated with the user device 112, and/or other physiological data via various biometric sensors either coupled to the user device 112 or incorporated into the user device 112. In some examples, the participating user 108 may utilize additional data capture systems, such as a physiological monitoring system (not shown) worn by the participating user, such as on the head, hands, fingers, or the like of the participating user 108.

In an example, physiological data of the user may be captured by the physiological monitoring system. Physiological data may include blood pressure, heart rate, pulse oximetry, respiratory rate, brain activity, eye movement, facial features, body movement, and so on. The physiological data may be used in determining a mood or response of the user to content (e.g., streaming titles, advertisements, or the like) displayed to the user or system responses to interactions of the user with the simulated streaming service. In some examples, an eye tracking device of the physiological monitoring system as described herein may utilize image data associated with the eyes of the user as well as facial features (such as features controlled by the user's corrugator and/or zygomaticus muscles) to determine a portion of a display that is currently the focus of the user's attention.

In some cases, each customized simulation instance 114 may also allow the user to provide feedback data 120, such as text-based or verbal, back to the simulation system 102. For example, the customized simulated instance 114 may include a first portion of an interface for simulating the software application or service of the third-party system 106 and a second portion of the interface to allow the user to provide text based comments, input rating (such as via one or more sliders for like/dislike, fear/joy, clarity/confusion, or the like). In still other examples, the second portion of the simulation instance 114 may include numerical ratings such as allowing the user 108 to input one to five stars, one or more thumbs up or down, or the like. In another example, the participating user 108 may provide the feedback via a microphone associated with a television controller or remote control or other audio capture device (e.g., one or more microphones associated with a personal computing device, an audio controlled device, or the like).

In the current example, the third-party system 106 and third-party client system 128 are illustrated as separate systems. However, it should be understood that in some examples, the third-party system 106 and the third-party client system 128 may be the same, such as when a third-party client is testing or evaluating their own software application and/or service.

In the current example, the data, applications, and the like may be transmitted between various systems using networks, generally indicated by 130-134. The networks 130-134 may be any type of network that facilitates compunction between one or more systems and may include one or more cellular networks, radio, WiFi networks, short-range or near-field networks, infrared signals, local area networks, wide area networks, the internet, and so forth. In the current example, each network 130-134 is shown as a separate network but it should be understood that two or more of the networks may be combined or the same.

Figure 2:
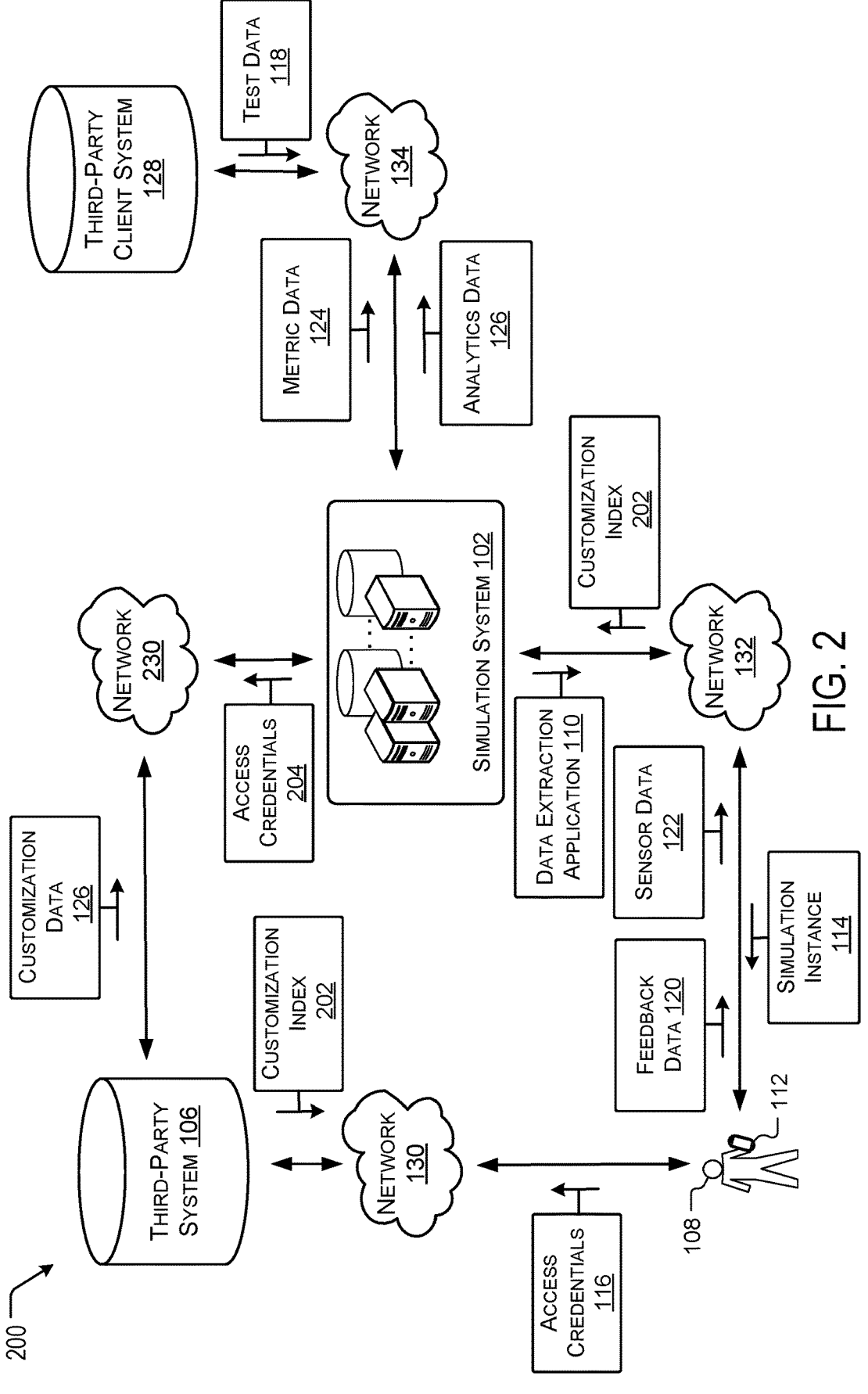
FIG. 2 is another example block diagram of a simulation system for generating user specific simulation instances according to some implementations.

FIG. 2 is another example block diagram 200 of a simulation system 102 for generating user specific simulation instances according to some implementations. In the current example, the simulation system 102 operates in a manner similar to that discussed above with respect to FIG. 1. However, in the current example, the data extraction application 110 may be configured to determine that the user has accessed the software application and/or service hosted by the third-party system 106 via the device 112. The data extraction application 110 may then capture data associated with the software application and/or service to generate a customization index 202 rather than scraping the customization data 104 directly from the third-party system 106. For example, the customization data 106 may contain a large number of files, settings, parameters, and the like that may, in some cases, negatively impact the performance of the device 112 when accessing the software application and/or service hosted by the third-party system 106.

In these cases, the simulation system 102 may utilize the data extraction application 110 to generate the customization index 202 representative of the customer experience of the user 108 with respect to the software application and/or service hosted by the third-party system 106. For example, the customization index 202 may include a list of content data (e.g., titles, works, authorships, advertisements, or other content items) that the user 108 encountered during use of the software application and/or service. The customization index 202 may also include a list of settings, preferences, user interface arrangements, or the like. The customization index 202 may also include images of the user interface in response to various triggers (e.g., time based triggers, such as every second, five seconds, minute, or the like, interaction triggers, such as page scrolling, page changes, user inputs, and the like).

The data extraction application 110 may then be configured to provide the customization index 202 back to the simulation system 102. The simulation system 102 may then access the third party system 106 to obtain the customization data 104 directly. For example, the simulation system 102 may download or extract content items (e.g., videos, images, works, text, or the like) directly from the third-party system 106 based at least in part on the items indicated in the customization index 202. In this manner, the simulation system 102 is still able to obtain and generate customized simulation instances 114 for the user 108 based on the user's personal experience with the software application and/or service hosted by the third-party system 106 without requiring the user device 112 to download and subsequently upload large data files from the third party system 106 to the simulation system 102.

In the current example, the simulation system 102 may also provide access credentials 204 to the third-party system 106 to obtain access. In some cases, the access credentials 204 may be registered with the simulation system 102. In one specific example, the access credentials 204 may be the access credentials 116 provided by the user 108 and/or an access credentials that are associated with the user account with the third-party system 106 via a third-party access authorization token or the approved by the user 108 and provided by the third party system 106 to the simulation system 102.

As discussed above, the third-party system 106 and the third-party client system 128 may be the same in some cases. In these cases, the access credentials 204 may allow the simulation system 102 to access the customization data 104 directly from the third-party systems and/or the third-party systems may provide the customization data 104 to the simulation system 102 via a request or query (such as including the customization index 202). In this manner, the simulation system 102 may request the customization data 104 rather than searching for and extracting each content item or the like.

As discussed above, the simulation system 102 may generate the customized simulation instance 114 for the user 108 based at least in part on the customization data 104, the test data 118, and/or the customization index 202. The simulation system 102 may receive the feedback data 120 and/or the sensor data 122 associated with the user 108. The simulation system 102 may then generate the metric data 124 and/or the analytics data 126 for the third-party client system 128.

In some cases, the data extraction application 110 may also operate on the device 112 to host the simulation instance 114 and/or capture the feedback data 120 and/or the sensor data 122. In other examples, additional downloadable instructions may be responsible for the execution of the simulation instance 114 and capturing the feedback data 120 and/or the sensor data 122.

FIGS. 3, 4 and 5 are flow diagrams illustrating example processes associated with the asset management system discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, when executed by one or more processor(s), performs the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 illustrates an example flow diagram showing an illustrative process 300 for generating user specific simulation instances according to some implementations. As discussed herein, a simulation system may be configured to generate customized simulation instances to replicate a customized experience encountered by a user when accessing software applications or services to reduce negative bias during the simulation and improve the overall quality of the information determined during the simulation compared with conventional simulation systems or focus group systems.

At 302, the simulation system may receive authorization for a first user to participate in a simulation event. For example, each user may sign a release, agreement, confidentiality, authorization to access their accounts with third parties, and the like when the user agrees to participate in the simulation event. In some cases, the simulation system may refrain from including a user in any simulation event until the authorization is received from that user.

At 304, the simulation system may provide a data extraction application to a first user device associated with the first user. For example, the first user may access a link to download the data extraction application on one or more of devices belonging to the first user. The data extraction application may then download and install on the device. In some cases, the first user may configure the data extraction application via a user account to provide any additional data or approvals prior to the data extraction application operating to capture customization data for one or more third party software applications and/or services. As an illustrative example, the first user may enter indications (such as identifiers) of the third-party software applications and/or services that the data extraction application may capture or generate customization data for or otherwise access.

At 306, the simulation system may receive first customization data from the data extraction application hosted on the first user device. As discussed herein, the data extraction application may capture customization data from a user's account with a software application or service as the user engages with the account. That customization data may then be sent back to the simulation system for incorporating into a customized simulation instance.

At 308, the simulation system may receive test data from a client system. The test data may include content data (e.g., advertisements, streaming content, textual content, image content, and the like), software edits, features, navigational experiences, performance goals, and the like. In some cases, the test data may also include third-party client data associated with a service, feature, product, interface, advertisement, or the like to be evaluated by the participating user. For instance, if the software application or service is a social video sharing application, the test data may include a video or advertisement that the third-party desires to evaluate reception prior to launching or offering to the public via the software application.

At 310, the simulation system may generate a first customized simulation instance based at least in part on the first customization data and the test data. For example, the simulation system may generate a simulation instance representative of the third-party software application or service that includes the test data (such as a specific content item, user interface feature, or the like). The simulation system may also adjust the simulation instance to include content, features, settings, parameters (user defined or learned) that are represented in the first customization data received from the data extraction application. In this manner, the simulation system may generate a simulation instance that is substantially similar to the experience the user encounters when engaging with the actual software application or service.

At 312, the simulation system may receive, in response to providing the first customized simulation instance to the first user device, first feedback data and first sensor data from the first user device. For example, the simulation system may cause the simulation instance to execute on the first user device. As the user engages with the first customized simulation instance, the first user device may capture the first feedback data and the first sensor data. For instance, the first sensor data may include image data, biometric data, audio data and the like. In some cases, the first feedback data may include audio data, textual data, engagement data, or the like provided by the user via the first user device.

At 314, the simulation system may receive authorization for a second user to participate in the simulation event. For example, similar to the first user, the simulation system may, for each user, receive a release, agreement, confidentiality, authorization to access their accounts with third parties, and the like when the user agrees to participate in the simulation event. In some cases, the simulation system may refrain from including a user in any simulation event until the authorization is received from that user.

At 316, the simulation system may provide the data extraction application to a second user device associated with the second user. For example, the second user may also access a link to download the data extraction application on one or more of devices belonging to the second user. The data extraction application may then download and install on the device. In some cases, the second user may configure the data extraction application via a user account to provide any additional data or approvals prior to the data extraction application operating to capture customization data for one or more third party software applications and/or services. As an illustrative example, the second user may enter indications (such as identifiers) of the third-party software applications and/or services that the data extraction application may capture or generate customization data for or otherwise access.

At 318, the simulation system may receive second customization data from the data extraction application hosted on the second user device. As discussed herein, the data extraction application may capture the second customization data from the second user's account with the software application or service as the second user engages with the account. The second customization data may then be sent back to the simulation system for incorporating into a customized simulation instance.

At 320, the simulation system may generate a second customized simulation instance based at least in part on the second customization data and the test data, the second customized simulation instance different than the first customized simulation instance. For example, the simulation system may generate the second customized simulation instance representative of the third-party software application or service that includes the test data (such as a specific content item, user interface feature, or the like). The simulation system may also adjust the second customized simulation instance to include content, features, settings, parameters (user defined or learned) that are represented in the second customization data received from the data extraction application operating on the second user device. In this manner, the simulation system may generate the second customized simulation instance that is substantially similar to the experience the second user encounters when engaging with the actual software application or service.

At 322, the simulation system may receive, in response to providing a second customized simulation instance to a second user device, second feedback data and second sensor data from the second user device. For example, the simulation system may cause the second customized simulation instance to execute on the second user device. As the second user engages with the second customized simulation instance, the second user device may capture the second feedback data and the second sensor data.

In some cases, additional users may be associated with a simulation event and the simulation system may generate customized simulation instances for each of these additional users as well. In these cases, the process 300 may return to 314 until each additional user also has provided corresponding feedback data and sensor data. It should be understood, that 302-322 may be performed by multiple users concurrently or within a defined period of time (e.g., a day, week, month, or the like). In this manner, multiple users may engage simulation instances concurrently and at their own pace.

At 324, the simulation system may generate first metric data associated with the first user based at least in part on the first sensor data and the first feedback data and second metric data associated with the second user based at least in part on the second sensor data and the second feedback data and, at 326, the simulation system may generate analytics data associated with the simulation event based at least in part on the first sensor data, the first feedback data, the second sensor data, and the second feedback data. For example, the simulation system may generate metric data for each user participating in the simulation event. Likewise, the simulation system may generate analytics data for all users or sets of users participating in the simulation event. For instance, the simulation system may generate the analytics data based on multiple evaluations of received feedback data, and/or sensor data. As one specific example, the simulation system may provide the feedback data and/or the sensor data to one or more reviewers, simulation system operators, machine learned models, or the like that may review the feedback data and/or the sensor data and generate initial metrics for each simulation instance or the analytics data for combined simulation instances across multiple users. For instance, as each user encounters a customized simulation instance, the simulation system may then perform aggregation or normalization techniques on the user feedback data and/or the sensor data to generate both the metric data and the analytics data which may be provided to the third-party client system.

FIG. 4 illustrates another example flow diagram showing an illustrative process 400 for generating user specific simulation instances according to some implementations. As discussed herein, a simulation system may be configured to generate customized simulation instances to replicate a customized experience encountered by a user when accessing a software applications or services to reduce negative bias during the simulation and improve the overall quality of the information determined during the simulation compared with conventional simulation systems.

At 402, the simulation system may receive authorization for a plurality of users to participate in a simulation event. For example, each user may sign a release, agreement, confidentiality, authorization to access their accounts with third parties, and the like when the user agrees to participate in the simulation event. In some cases, the simulation system may refrain from including a user in any simulation event until the authorization is received from that user.

At 404, the simulation system may provide a data extraction application to a user device associated with each of the plurality of users. For example, each user may access a link to download the data extraction application on one or more of devices belonging to the corresponding user. The data extraction application may then download and install on the device. In some cases, each user may configure the data extraction application via a user account to provide any additional data or approvals prior to the data extraction application operating to capture customization data for one or more third party software applications and/or services. As an illustrative example, each user may enter indications (such as identifiers) of the third-party software applications and/or services that the data extraction application may capture or generate customization data for or otherwise access.

At 406, the simulation system may receive, from each user device, a customization index associated with a corresponding user. For example, the customization data may contain a large number of files, settings, parameters, and the like that may, in some cases, negatively impact the performance of the device when accessing the software application and/or service hosted by the third-party system. In these cases, the simulation system may utilize the data extraction application to generate the customization index representative of the customer experience of each user 108 respect to the software application and/or service hosted by the third-party system. For example, the customization index may include a list of content data (e.g., titles, works, authorships, advertisements, or other content items) that each user encountered during use of the software application and/or service. The customization index may also include a list of settings, preferences, user interface arrangements, or the like for each user. The customization index may also include images of the user interface in response to various triggers (e.g., time based triggers, such as every second, five seconds, minute, or the like, interaction triggers, such as page scrolling, page changes, user inputs, and the like).

At 408, the simulation system may access a software application or service to extract customization data for each of the plurality of users based on the corresponding customization index. For example, the simulation system may extract the customization data directly from the third-party system based at least in part on the customization index. In some cases, the simulation system may have its own account with the third-party software application or service that may utilized to access and download the desired customization data, such as content data. In some cases, by having the simulation system download the customization data, the system discussed herein, may reduce the overall data transfer and resource consumption caused by downloading duplicate customization data for multiple users (e.g., when multiple users have, for instance, the same content title as part of their customization data).

At 410, the simulation system may generate a customized simulation instance for each of the plurality of users of the simulation event based on the corresponding customization data. In some cases, the simulation system may generate a simulation instance representative of the third-party software application or service that includes the test data (such as a specific content item, user interface feature, or the like) for each user. The simulation system may then adjust, modify, populate, or the like each simulation instance to include content, features, settings, parameters (user defined or learned) that are represented in the customization index for each user based on the extracted customization data. In this manner, the simulation system may generate a simulation instance that is substantially similar to the experience that each user encounters when engaging with the actual software application or service.

At 412, the simulation system may receive, in response to providing each of the customized simulation instance, feedback data and sensor data for each of the plurality of users. For example, the simulation system may cause each simulation instance to execute on a user device associated with the corresponding user. As each user engages with their customized simulation instance, the user devices may capture the feedback data and the sensor data associated with each user.

At 414, the simulation system may generate metric data for each of the plurality of users based at least in part on the corresponding feedback data and the sensor data and, at 416, the simulation system may generate analytics data associated with the simulation event based at least in part on the feedback data and the sensor data for the plurality of users. For example, the simulation system may generate metric data for each user participating in the simulation event. Likewise, the simulation system may generate analytics data for all users or sets of users participating in the simulation event. For instance, the simulation system may generate the analytics data based on multiple evaluations of received feedback data, and/or sensor data. As one specific example, the simulation system may provide the feedback data and/or the sensor data to one or more reviewers, simulation system operators, machine learned models, or the like that may review the feedback data and/or the sensor data and generate initial metrics for each simulation instance or the analytics data for combined simulation instances across multiple users. For instance, as each user encounters a customized simulation instance, the simulation system may then perform aggregation or normalization techniques on the user feedback data and/or the sensor data to generate both the metric data and the analytics data which may be provided to the third-party client system.

FIG. 5 illustrates an example flow diagram showing an illustrative process 500 for extracting customization data for users of the simulation system according to some implementations. As discussed above, the data extraction application may be downloaded and/or installed on a user device, such as a test user device, to extract, capture, and/or otherwise generate the customization data or customization indexes for use by the simulation system.

At 502, the data extraction application may detect access by a user of a device to a desired software application or service. For example, the device hosting the data extraction application may be used to access, such as via an app or web-browser, the desired software application or service. The data extraction application may be configured to detect the access and to verify that the desired software application or service is the software application or service being accessed.

At 504, the data extraction application may extract customization data (or generate a customization index) associated with the desired software application or service as the user engages with the desired software application or service. For example, the data extraction application may identify content data (e.g., advertisement, titles, eBooks, posts, or the like presented on the display of the device), customization settings and/or parameters (e.g., display arrangements, interface options, and the like), relationships (e.g., friends, commenters, followers, and the like), as well as other data associated with the desired software application or service. In some cases, the data extraction application may have been provided access to the account data such as account controls to determine settings and the like associated with the user account while the user is accessing the desired software application or service.

At 506, the data extraction application may provide the customization data to a simulation system. For example, the data extraction application may provide the customization data for the specific user to the simulation system such that the simulation system may generate a customized simulation instance for the user using the customization data and any additional desired test data.

At 508, the data extraction application may receive instructions associated with a simulation instance that has been customized for the user based on the customization data. For example, the data extraction application may also be used to execute the simulation instances with regards to the user and/or an additional application (e.g., a simulation application) may be used to execute the simulation instances for the user. In either case, the data extraction application and/or the simulation application may receive instructions associated with a simulation instance that has been customized for the user based on the customization data which when executed causes the simulation instance to be displayed via a display of the user device.

At 510, the data extraction application and/or the simulation application may execute the simulation instance. For example, the user may select the application and the simulation instance to trigger the simulation's execution on the user device.

At 512, the data extraction application and/or the simulation application may capture sensor data associated with the user while the user engaged the simulation instance. For example, the sensor data may include image data, biometric data, audio data and the like. In some cases, the sensor data may be captured by one or more sensors associated with the device hosting the data extraction application and/or the simulation application while in other cases the sensors may be associated with a remote device.

At 514, the data extraction application and/or the simulation application may capture feedback data associated with the simulation instance. For example, the feedback data may include audio data, textual data, engagement data, or the like provided by the user via the first user device. In some cases, the feedback data may include opinions, moods, reactions, feelings, and the like provided by the user while engaged with the simulation instance.

At 516, the data extraction application and/or the simulation application may provide the sensor data and the feedback data to the simulation system. For example, the simulation system may aggregate and/or analyze the sensor data and/or feedback data for multiple users as each user engages a customized simulation instance to generate metrics for a third-party client.

Figure 6:
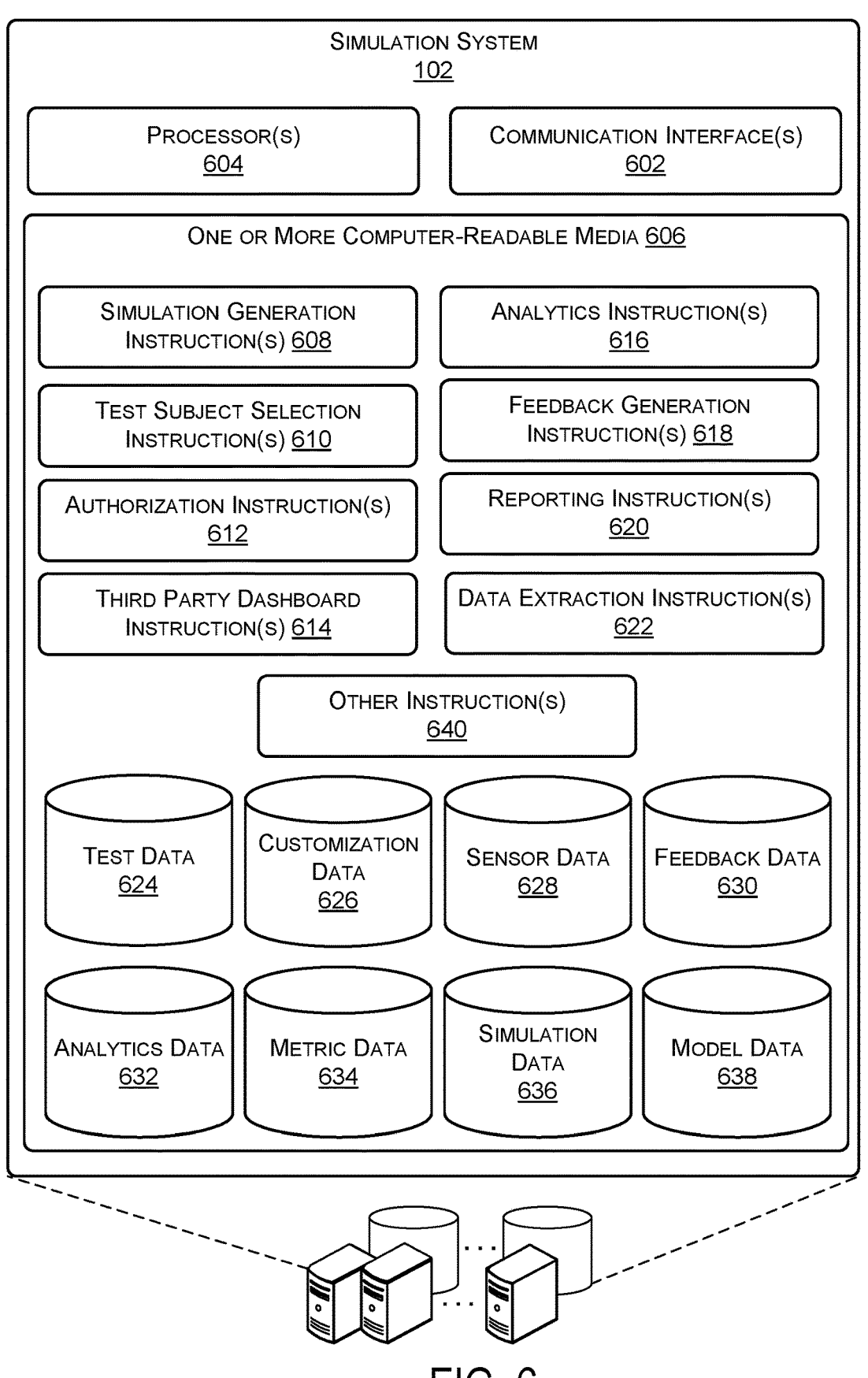
FIG. 6 illustrates an example simulation system according to some implementations.

FIG. 6 illustrates an example simulation system 102 according to some implementations. In the illustrated example, the simulation system 102 includes one or more communication interfaces 602 configured to facilitate communication between one or more networks, one or more system (e.g., user devices and third-party systems). The communication interfaces 602 may also facilitate communication between one or more wireless access points, a master device, and/or one or more other computing devices as part of an ad-hoc or home network system. The communication interfaces 602 may support both wired and wireless connection to various networks, such as cellular networks, radio, WiFi networks, short-range or near-field networks (e.g., Bluetooth®), infrared signals, local area networks, wide area networks, the Internet, and so forth.

The simulation system 102 includes one or more processors 604, such as at least one or more access components, control logic circuits, central processing units, or processors, as well as one or more computer-readable media 606 to perform the function of the simulation system 102. Additionally, each of the processors 604 may itself comprise one or more processors or processing cores.

Depending on the configuration, the computer-readable media 606 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 604.

Several modules such as instructions, data stores, and so forth may be stored within the computer-readable media 606 and configured to execute on the processors 604. For example, as illustrated, the computer-readable media 606 stores simulation generation instructions 608, test subject selection instructions 610, authorization instructions 612, third party dashboard instructions 614, analytics instructions 616, feedback generation instructions 618, reporting instructions 620, data extraction instructions 622 as well as other instructions 640 such as an operating system. The computer-readable media 606 may also store data, such as the test data 624, customization data 626, sensor data 628, feedback data 630, analytics data 632, metric data 634, simulation data 636, user data 642, and the like. The computer-readable media 606 may also store one or more machine learned models 638, as discussed herein.

The simulation generation instructions 608 may be configured to receive the test data 624 associated with a simulation event as well as customization data 626 for each user selected to participate in a simulation event. The simulation generation instructions 608 may then generate a customized simulation instance for each user, such as via one or more machine learned models or the like.

The test user selection instructions 610 may be configured to select test users, such as the user, for participation in one or more simulation events. For example, the test user selection instructions 610 may select the user based at least in part on the any user data known about each test user. For example, the test user selection instructions 610 may utilize demographic information, such as race, sex, gender, address, education, income, content taste profiles (e.g., based on for instance preferred genres, prior ratings, title consumption history, or the like), consumption hours (e.g., hours per day, week, or month consuming streaming services), job description, and the like. In some cases, the test user selection instructions 610 may include one or more machine learned models and/or networks to determine the users for each simulation event.

The authorization instructions 612 may be configured to allow each user to authorize the data extraction applications and/or the simulation system 102 to access their accounts with third party software applications or services and to extract the customization data 626 usable to generate the customized simulation instance for the user.

The third party dashboard instructions 614 may be configured to present the feedback data 630, the analytics data 632, the metric data 634 as well as other information to the third-party client, such as via a webhosted application, a downloadable application, or the like. For instance, the third-party dashboard instructions 614 may present the feedback data 630, the analytics data 632, the metric data 634 to the third-party client in a manner that is easy to consume and/or highlights themes, trends, maximums/minimums, peaks/valleys, or other statistical metrics, measurements, displays, graphs, or the like.

The analytics instructions 616 may be configured to determine the analytics data 630 and/or the metric data 632 based at least in part on the sensor data 628, the feedback 630, and the like associated with one or more users, such as users. For example, the analytics instructions 616 may aggregate data associated with multiple customized simulation instances or sessions for the same test data 624. In other words, the same simulation event may be presented to a plurality of test users, the data captured during each session may be aggregated, and trends or other metrics may be determined or extracted from the aggregated data. In some cases, the analytics data 632 and/or the metric data 634 may include scores, ranking (e.g., cross comparisons of different content items, such as different titles or different advertisement), receptions ratings, and the like.

The feedback generation instructions 618 may be configured to generate and/or organize the feedback data 630 for the third-party system based at least in part on user data received from the user during or after a simulation session. In some cases, the feedback generation instructions 618 may utilize the generated analytics data 632 and/or metric data 634 to determine recommendations or additional feedback data 630 for the third-party system. In some cases, the feedback generation instructions 618 may include one or more machine learned models and/or networks to determine the recommendations. In these cases, the one or more machine learned models and/or networks may be trained using historical analytics data 632, metric data 634, and user feedback data 630.

The reporting instructions 620 may be configured to report the feedback data 630, the analytics data 632, the metric data 634, and the like to the client (e.g., the third-party system). In some cases, the reports may include transcripts of any audio provided by the user as well as any trends, recommendations, or the like generated by the simulation system 102 with respect to one or more simulation sessions associated with a third parties test data 624.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

receiving a first customization index associated with a first user and a software application from a first data extraction application hosted on a first device associated with the first user, wherein the software application is associated with a first third-party;

receiving, in response to providing the first customization index, first customization data associated with the first user and the software application from the first data extraction application hosted on the first device associated with the first user;

generating based at least in part on the first customization data and test data associated with a simulation event, a first customized simulation instance, the first customized simulation instance configured to replicate a user experience of the first user when engaged with the software application, wherein the test data is received from a third-party client system associated with a second third-party;

providing the first customized simulation instance to the first device;

receiving, in response to providing the first customized simulation instance to the first device, first user data associated with an execution of the first customized simulation instance and the first user;

generating, based at least in part on the first user data, first metric data associated with the first user and the test data; and providing the first metric data to the third-party client system associated with the second third-party.

2. The method of claim 1, further comprising:

receiving a second customization index associated with a second user and a software application from a second data extraction application hosted on a second device associated with the second user, wherein the software application is associated with the first third-party;

receiving, in response to providing the second customization index, second customization data associated with the second user and the software application from the second data extraction application hosted on the second device associated with the second user;

generating based at least in part on the second customization data and test data associated with a simulation event, a second customized simulation instance, the second customized simulation instance configured to replicate a user experience of the second user when engaged with the software application, wherein the test data is received from the third-party client system associated with the second third-party;

providing the second customized simulation instance to the second device;

receiving, in response to providing the second customized simulation instance to the second device, second user data associated with an execution of the second customized simulation instance and the second user;

generating, based at least in part on the second user data, second metric data associated with the second user and the test data; and providing the second metric data to the third-party client system associated with the second third-party.

3. The method of claim 2, further comprising:

generating, based at least in part on the first user data, the second user data, analytics data associated with the test data; and providing the analytics data to the third-party client system associated with the second third-party.

4. The method of claim 2, wherein the first customized simulation instance differs from the second customized simulation instance.

5. The method of claim 1, wherein the first user data includes sensor data of the first user and an environment associated with the first user and feedback data provided by the first user.

6. The method of claim 1, wherein generating the first customized simulation instance further comprises inputting the first customization data and the test data into one or more machine learned models trained using prior simulation customization data and prior simulation test data and receiving, in response to inputting the first customization data and the test data, the first customized simulation instance as an output of the one or more machine learned models.

7. The method of claim 6, wherein:

the output of the one or more machine learned models is at least one of:

setting data associated with the software application and the first user;

user interface data associated with the software application and the first user; or content data associated with the software application and the first user; and the first customized simulation instance is generated based at least in part on the at least one of the setting data, the user interface data, or the content data.

8. One or more non-transitory computer readable media storing instructions executable by one or more processors, wherein the instructions, when executed, cause the one or more processors to perform operations comprising:

receiving a first customization index associated with a first user and a software application from a first data extraction application hosted on a first device associated with the first user, wherein the software application is associated with a first third-party;

receiving, in response to providing the first customization index, first customization data associated with the first user from a system associated with the software application;

generating based at least in part on the first customization data and test data associated with a simulation event, a first customized simulation instance, the first customized simulation instance configured to replicate a user experience of the first user when engaged with the software application, wherein the test data is received from a third-party client system associated with a second third-party;

providing the first customized simulation instance to the first device;

receiving, in response to providing the first customized simulation instance to the first device, first user data associated with an execution of the first customized simulation instance and the first user;

generating, based at least in part on the first user data, first metric data associated with the first user and the test data; and providing the first metric data to the third-party client system associated with the second third-party.

9. The one or more non-transitory computer readable media of claim 8, wherein the operations further comprising:

receiving a second customization index associated with a second user and the software application from a second data extraction application hosted on a second device associated with the second user, wherein the software application is associated with the first third-party;

receiving, in response to providing the second customization index, second customization data associated with the second user from the system associated with the software application;

generating based at least in part on the second customization data and test data associated with the simulation event, a second customized simulation instance, the second customized simulation instance configured to replicate a user experience of the second user when engaged with the software application, wherein the test data is received from the third-party client system associated with the second third-party;

providing the second customized simulation instance to the second device;

receiving, in response to providing the second customized simulation instance to the second device, second user data associated with an execution of the second customized simulation instance and the second user;

generating, based at least in part on the second user data, second metric data associated with the second user and the test data; and providing the second metric data to the third-party client system associated with the second third-party.

10. The one or more non-transitory computer readable media of claim 8, wherein the operations further comprising:

receiving, prior to receiving the first customization index, authorization data for the first data extraction application to access a first user account associated with the first user and the software application.

11. The one or more non-transitory computer readable media of claim 8, wherein the first customization index indicates one or more content items to be included in the first customized simulation instance.

12. The one or more non-transitory computer readable media of claim 8, wherein the operations further comprising:

providing a graphical user interface, the graphical user interface including the first metric data.

13. The one or more non-transitory computer readable media of claim 8, wherein the first user data includes sensor data of the first user and an environment associated with the first user and feedback data provided by the first user.

14. A system comprising:

one or more processors; and one or more non-transitory computer readable media storing instructions executable by the one or more processors, wherein the instructions, when executed, cause the one or more processors to perform operations comprising:

receiving a first customization index associated with a first user and a software application from a first data extraction application hosted on a first device associated with the first user, wherein the software application is associated with a first third-party;

receiving, in response to providing the first customization index, first customization data associated with the first user and the first data extraction application hosted on the first device associated with the first user;

generating based at least in part on the first customization data and test data associated with a simulation event, a first customized simulation instance associated with a simulation event, the first customized simulation instance to replicate a user experience of the first user when engaged with the software application, wherein the test data is received from a third-party client system associated with a second third-party;

receiving, in response to providing the first customized simulation instance to the first device, first user data associated with an execution of the first customized simulation instance;

generating, based at least in part on the first user data, first metric data associated with the first user; and providing the first metric data to the third-party client system associated with the second third-party.

15. The system of claim 14, wherein the operations further comprise:

receiving a second customization index associated with a second user and the software application from a second data extraction application hosted on a second device associated with the second user, wherein the software application is associated with the first third-party;

receiving, in response to providing the second customization index, second customization data associated with the second user and the second data extraction application hosted on the second device associated with the second user;

generating based at least in part on the second customization data and test data associated with the simulation event, a second customized simulation instance associated with the simulation event, the second customized simulation instance to replicate a user experience of the second user when engaged with the software application, wherein the test data is received from the third-party client system associated with the second third-party;

receiving, in response to providing the second customized simulation instance to the second device, second user data associated with an execution of the second customized simulation instance;

generating, based at least in part on the second user data, second metric data associated with the second user; and providing the second metric data to the third-party client system associated with the second third-party.

16. The system of claim 15, wherein the operations further comprise:

generating, based at least in part on the first user data and the second user data, analytics data associated with the simulation event; and providing the analytics data to the third-party client system associated with the second third-party.

17. The method of claim 1, wherein the first customization index indicates one or more content items to be included in the first customized simulation instance.

18. The system of claim 14, wherein the first customization index indicates one or more content items to be included in the first customized simulation instance.

\* \* \* \* \*